(No Model.) 3 Sheets—Sheet 2.
N. NEWSOM.
PNEUMATIC STRAW STACKER.
No. 524,394. Patented Aug. 14, 1894.
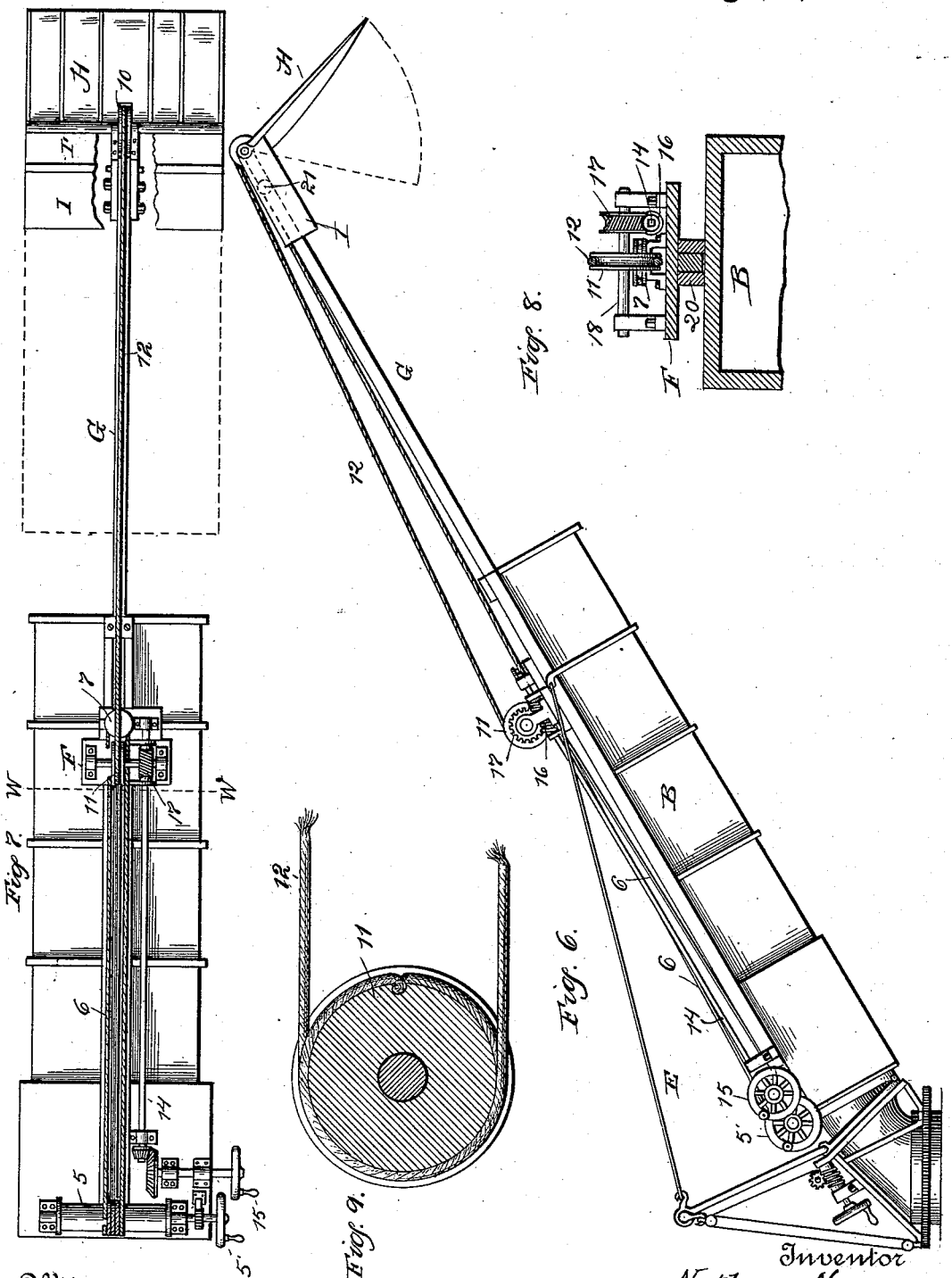
Witnesses
Victor J. Evans.
L. M. Marble
Inventor
Nathan Newsom
by E. M. Marble Sons
Attorneys

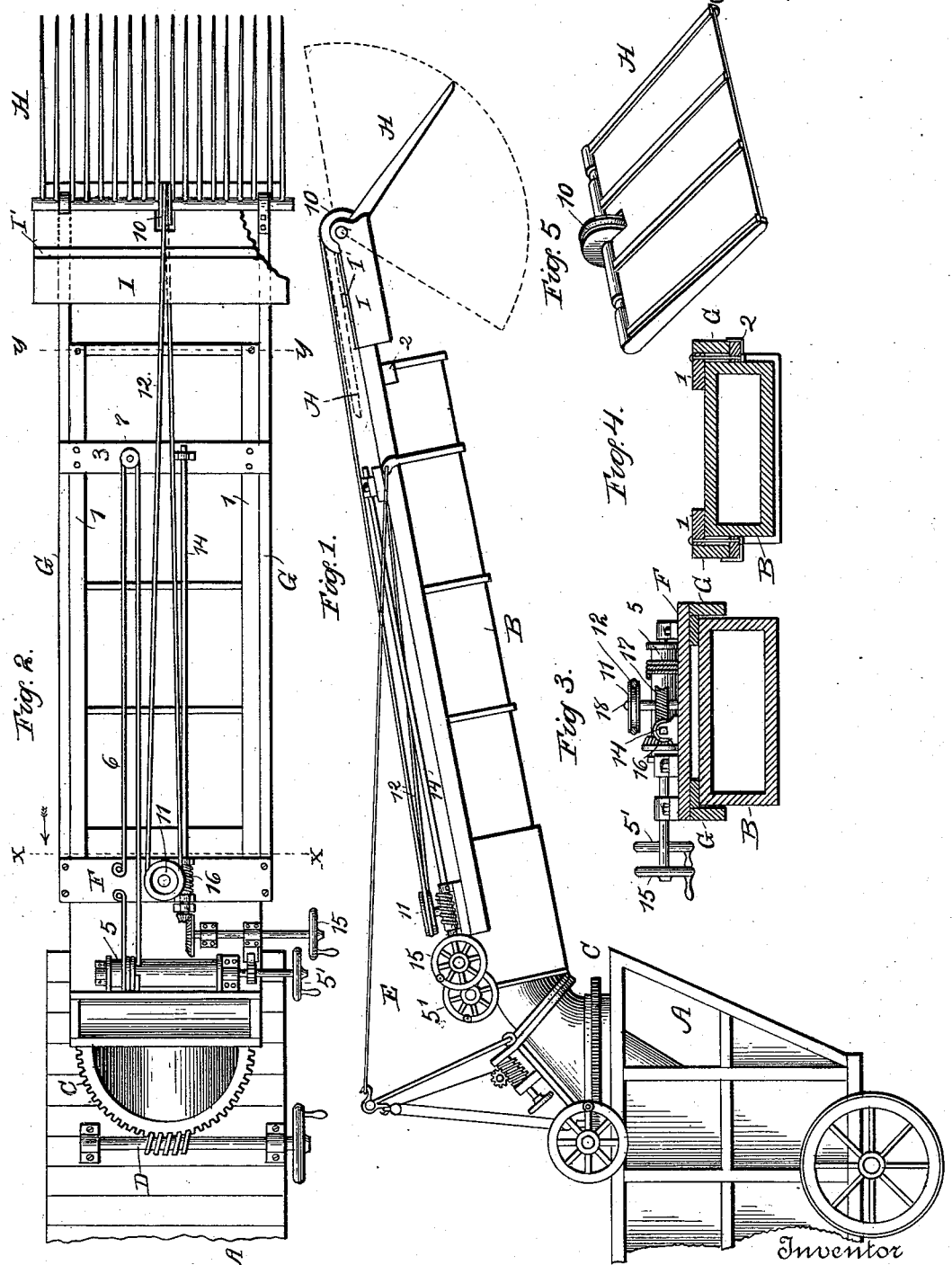

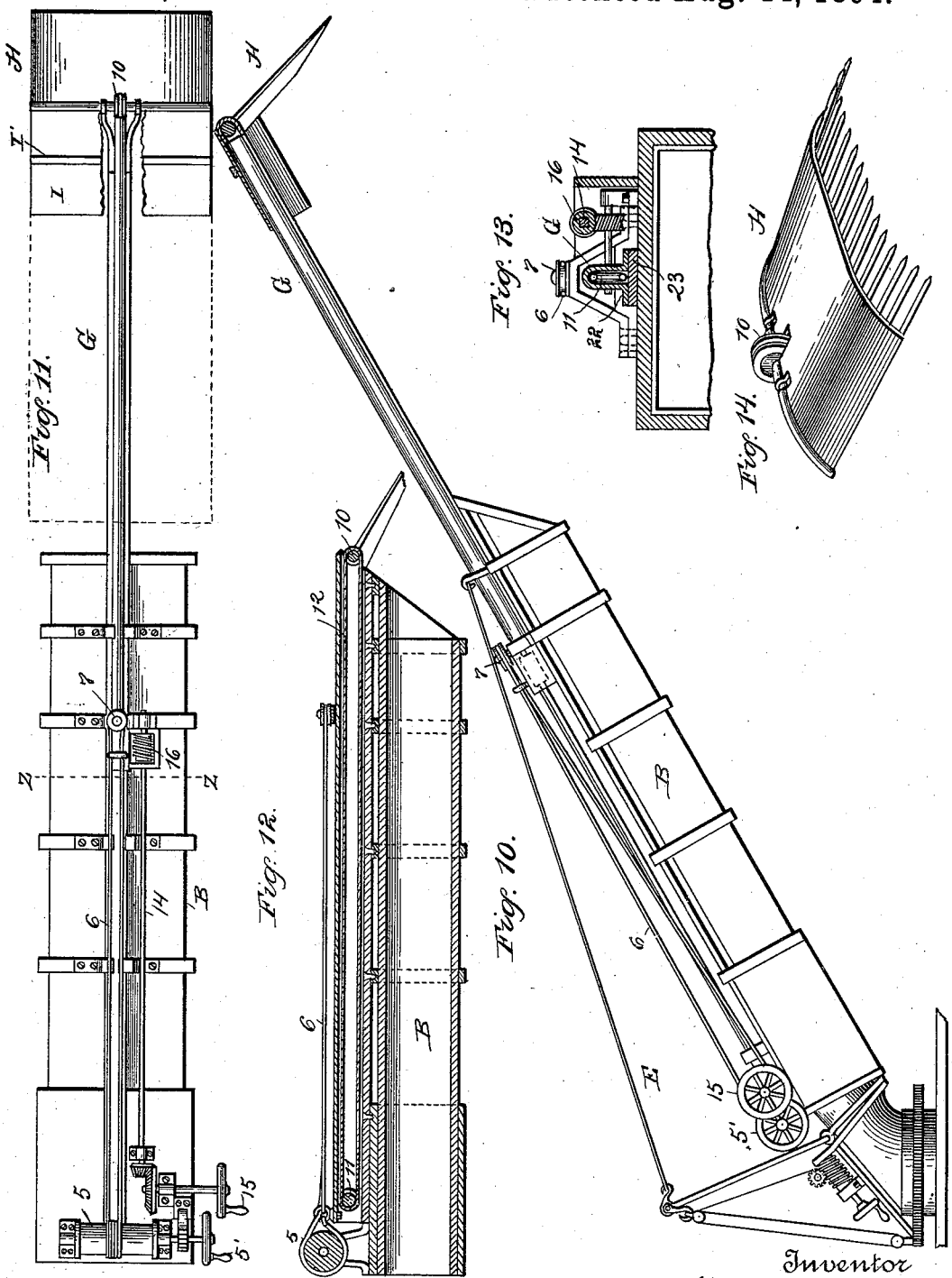

UNITED STATES PATENT OFFICE.

NATHAN NEWSOM, OF ELIZABETHTOWN, INDIANA.

PNEUMATIC STRAW-STACKER.

SPECIFICATION forming part of Letters Patent No. 524,394, dated August 14, 1894.

Application filed March 24, 1894. Serial No. 504,942. (No model.)

*To all whom it may concern:*

Be it known that I, NATHAN NEWSOM, a citizen of the United States, residing at Elizabethtown, in the county of Bartholomew and State of Indiana, have invented certain new and useful Improvements in Pneumatic Straw-Stackers; and I do hereby declare the following to be a full, clear, and exact description of the invention, such as will enable others skilled in the art to which it appertains to make and use the same.

My invention relates to improvements in machines for stacking straw, and especially to improvements in that class thereof known as pneumatic straw stackers, wherein the straw and chaff are delivered through the delivery chute by a current of air caused by the rotation of a fan situated in the thrasher itself, and it consists in an attachment by means of which the straw and chaff can be deflected from the course they pursue when delivered from the delivery chute, and so controlled in their further travel that they may be deposited in any specified place, thus forming a straw stack of any desired size and proportions, which will be hereinafter fully described and particularly pointed out in the claims.

In the use of pneumatic straw stackers, it has been found that if no means are provided for controlling the straw and chaff after they have been delivered from the delivery chute, they will be deposited on the ground anywhere from fifty to one hundred feet from the mouth of the delivery chute, being carried along by the air currents; and thus not only does it require a considerable amount of straw to form a good stack, but such stack when formed is uneven, and, the straw and chaff being spread over so large a surface, the stack is of relatively small height over a large portion of its surface. It is thus very much exposed to the rain, so that but little of the straw is dry enough to be in a condition for use by the end of the season, or when wanted.

The means which have heretofore been suggested to determine the delivery of the straw and chaff at a specified place, have, so far as I am aware, been confined to appliances placed directly on the end of the delivery chute, and no attempts have been made to control the straw and chaff after they have been delivered from the outer end of the chute. The controlling means heretofore usually employed consist in a movable hood or cowl attached to the delivery end of the chute, and capable of being adjusted to various angles to the current of straw and chaff, so that the said straw and chaff are diverted from the course in which they are carried by the air blast, and are directed in some measure in their further course. The chief objection to this method of handling the straw lies in the fact that the movable hood or cowl, being attached to the end of the delivery chute, does not exert a sufficient controlling influence on the straw and chaff to enable it to perform its function, and it is impossible with the present means to form the outlines of the stack clearly and distinctly, and to build the stack in a uniform and proper manner. It is impossible also to form a stack with a small amount of straw, and the objection is further presented that the straw and chaff become separated soon after they have passed out of the chute, the straw by the influence of gravity falling first, and the chaff falling farther on, and thus the stack ultimately formed is uneven and one sided. Moreover, those pieces of straw having heavy ends naturally fall with their heavy ends downward, and the stack finally formed contains layers of straw which are stratified vertically, and in a condition to be readily subject to deterioration by the influences of moisture.

My invention has for its object to provide means for effectually controlling the straw and chaff after their delivery from the chute, thus enabling the outlines of the stack to be formed clearly and definitely, and enabling the stack to be formed in any desired form or proportion. I also aim to compel the straw and chaff to fall together throughout the stack, and thus to produce a straw stack which is more uniform than any which can be produced by the means at present used, and which will not so readily rot and decay.

I accomplish the objects of my invention by placing the deflecting or controlling means directly over the place where it is desired to form the stack, thus enabling it to act upon the straw at the most favorable position for positively determining its further course of travel, and placing it at any desired point in the stack. I suspend in the path of the current of straw and chaff which comes from the open outer end of the delivery chute, and at an angle to the same, what I term a "deflecting apron," whether in the form of a rake, or in the form of a curved solid guide, or in any other suitable form, which diverts the straw and chaff from their then present course, and throws them upon the ground or stack at a point determined by the angle of the deflecting apron to the current of straw and chaff, and by its distance from the open outer end of the delivery chute. By pivoting the deflecting apron to an extensible arm or arms moving upon bearings formed on the top surface of the delivery chute, and operated by means situated at the base of the delivery chute, I make said apron adjustable as to its distance from the end of the same, and thus arrange for the delivery of the straw at any portion of the stack; and by rendering said apron radially adjustable, by means also operated from the base of the delivery chute, I still further control the delivery of the straw, and establish its future direction of travel, and place of deposit in the stack. The mechanism for controlling the deflecting apron is so placed that it can be operated by the same man who operates the pneumatic chute.

In the drawings accompanying and forming a part of this application, I have represented my invention in three different forms, they being the different ways in which I have embodied the same, and in these drawings, in which the same reference letters and numerals refer to the same or corresponding parts:—

Figure 1 is a side view, and Fig. 2 a plan view of a pneumatic straw stacker having my attachment thereon. Fig. 3 is a section of Fig. 2 taken on the line $x\,x$, looking in the direction of the arrow, and shows the mechanism which is used to operate the pulley by means of which the radial adjustment of the deflecting apron may be accomplished. Fig. 4 is a section of Fig. 2 on the line $y\,y$, showing particularly the supporting means for the extension arms to which the deflecting apron is pivoted. Fig. 5 is a view of a form of the deflecting apron different from that shown in Figs. 1 and 2. Figs. 6 and 7 are side and plan views, respectively, of a straw stacker having attached thereto another form of my deflecting device. Fig. 8 is an enlarged detail view of the mechanism used in this form for effecting the radial adjustment of the deflecting apron, taken on the line $w\,w$, Fig. 7. Fig. 9 is a detail view showing the manner in which I attach the operative rope for effecting the radial adjustment of the deflecting apron to one of the pulleys around which it passes. Figs. 10 and 11 are side and plan views, respectively, of a pneumatic straw stacker having attached thereto still another form of my deflecting device. Fig. 12 is a central longitudinal section of the pneumatic straw stacker, the deflecting device being drawn inward. Fig. 13 is a cross section of Fig. 11 taken on the line $z\,z$, showing the form of the extension arm and its method of support, showing the mechanism for radially adjusting the deflecting apron, and showing the support for the pulley which, in conjunction with other parts, determines the position of the extensible arm. Fig. 14 is a view showing one other of the many forms of the deflecting apron which I may use.

Referring to the drawings, A represents a thrasher, to the top of which is rotatively attached the delivery chute B.

C is the gear wheel by the rotation of which the radial position of the delivery chute can be altered at will, and D is a suitably journaled rod which is provided with a worm gear for engaging and operating wheel C.

E represents the means commonly used for vertically adjusting the delivery chute.

The straw stacker is of that type in which the straw and chaff are delivered, by a current of air formed by the rotation of a fan situated in the thrasher itself, from the open outer end of the delivery chute, and the attachments thus far described are those which are common with this class of stackers.

I will now proceed to describe my attachment for controlling the straw after its delivery from the chute.

On the upper surface of the delivery chute, I form bearings 1, on which reciprocates the sliding board F, to which are firmly secured the extension arms G, to the outer ends of which the deflecting apron H is pivoted. These extension arms move at their outer ends upon bottom bearing surfaces formed by the brackets 2 (see Fig. 4), and are held from rising upward by the board 3, which is bolted to the chute and extends sufficiently far beyond the sides of the same to perform the function stated. The deflecting apron H, which it has been stated is pivotally secured to the ends of the extension arms G, may be in the form of a rake, as shown in Fig. 2, or in the form of a solid guide, as shown in Fig. 5, or curved in the manner shown in Fig. 11, or two-thirds solid with rake teeth projecting from the bottom, as shown in Fig. 14. The form of this apron is immaterial, so long as it presents sufficient body to deflect from the course it then pursues the stream of straw and chaff which is driven from the delivery chute, and to establish the direction of its future travel. Being held directly over the place where the stack is to be formed or is forming, the straw and chaff are able to be placed in the most convenient manner, and will of necessity fall together.

To effect the longitudinal adjustment of the apron H and of the frame to which it is attached, rope 6 is attached at one end to the sliding board F, then passes around pulley 7, journaled on top of the board 3, thence around the rotary drum 5, which is journaled in suitable bearings bolted to the top of the delivery chute, and is operated by the hand wheel 5', and thence to the board F. By rotating drum 5, the deflecting apron may be drawn forward or back, and thus longitudinally adjusted with reference to the delivery chute. The radial adjustment of the apron is accomplished as follows: To the middle of the bar which forms the top of the apron H is keyed the pulley 10, and upon the sliding board F is journaled a pulley 11. Around these pulleys passes the rope 12, which is rigidly held to prevent slipping, as shown in Fig. 9, or a sprocket chain may be substituted in its place. Lengthwise of the delivery chute, and having its fixed bearings near the rear end of said chute and on the board 3, is a square rod 14, operated by the hand wheel 15, and miter gears, and having loosely fitting thereon, a worm wheel 16, which meshes with the gear 17, which is mounted upon and keyed to the short rod 18, which forms the bearing for pulley 11. The rotation of the pulley 11 is thus secured by the rotation of the hand wheel 15, and as pulleys 10 and 11 are rigidly connected together, the radial position of the apron H may be thus varied as desired. The length of the square rod 14 permits the sliding board F to move forward and back, while at all times the positive movement of the apron H is insured by the operation of the hand wheel 15. The effective range of movement of the apron H is indicated by dotted lines in Fig. 1, but when the deflecting device is drawn inward, and it is desired to move the thrasher from place to place, the apron may be folded back upon the extension arms, and will then rest upon the square rod I', which is formed on top of the straw guard I, which straw guard prevents any straw from being carried over and out of the range of action of the apron H.

In Figs. 6 and 7, I have illustrated another form of mechanism for controlling the apron H, which is somewhat preferable to that shown in Figs. 1 and 2 on account of the gain in cheapness of construction. In the construction here shown, I depart from the use of side extension arms and side tracks, and use instead a single centrally located extension arm G, which moves in suitably formed guide ways 20 secured to the top of the delivery chute. This arm is moved forward and back, as before, by the rope 6 passing around drum 5 and attached to the sliding board F, but in this case the sliding board does not extend entirely across the top surface of the delivery chute, but is merely wide enough to afford a proper place for attaching the operating rope 6, and for journaling and supporting the mechanism used to effect the radial adjustment of the deflecting apron, such mechanism being shown enlarged in Fig. 8.

Since the operative mechanism is the same as that already described in connection with Figs. 1 and 2, it is not necessary to again describe the same. The rope 12, which operates the apron H, passes directly over the top of the extension arm G; and to avoid the chafing of this rope against the top of the arm at the outer end of the same, pulley 21 is journaled on said arm so as to raise the rope from the same.

In Figs. 10 to 13, inclusive, I have represented still another modification of the mechanism for controlling the apron H. The chief modification here introduced is that the central extension arm G is made hollow, and in the same are journaled the pulleys 10 and 11 around which passes the rope which controls the radial movement of the apron H. The extension arm is made out of sheet metal pressed into ⊓ shape, with extended side flanges which pass under the bearings 22, and which move upon the bottom support 23. The mechanism which actuates pulley 11 to radially adjust the apron H is in this case inclosed in an iron box riveted to the side of the extension arm, thus securing greater compactness. Instead of attaching the rope 6 to a sliding board arranged transversely of the delivery chute, I attach the ends of said rope to the end of the extension arm, and journal roller 7 to a bracket, which, as shown in Fig. 13, is ⊓ shaped, and extends over the extension arm.

All of these changes have been made with a view of securing additional cheapness and simplicity of construction, and to render the operation of the device easier, and to protect the parts from wear. It is obvious that other changes of construction may be made without departing from the spirit and scope of my invention.

The operation of all of the forms which I have illustrated is the same. The deflecting apron H is first extended to the extreme limit of its travel, and is radially adjusted so as to direct the straw to the outer boundary of the proposed stack. It is drawn inward and radially adjusted at proper times to form the complete outlines of the stack, and the stack may be built up in a uniform and workmanlike manner, and finished in such a way as to prevent as far as possible the straw from decaying and rotting. The stack formed will be of equal density throughout, the straw and the chaff being deposited together, and the control of the straw is so perfect that a stack may be formed equally well with a small quantity of straw as with a large quantity of straw.

Having thus fully described my invention, what I claim as new, and desire to secure by Letters Patent, is—

1. In a pneumatic straw stacker, the combination with a delivery chute, of an arm or arms projecting therefrom, and a deflecting apron, attached to said arm or arms at a distance from the mouth of the delivery chute, and arranged in the path of the material delivered from said chute in such a manner as to direct its further course, the uninclosed space between the mouth of the chute and the apron permitting the air to dissipate in all directions, substantially as described.

2. In a pneumatic straw stacker, the combination with a delivery chute, of a longitudinally slidable arm or arms projecting therefrom, a deflecting apron, attached to said arm or arms, and arranged in the path of the material delivered from said chute in such a manner as to direct its further course, the uninclosed space between the mouth of the chute and the apron permitting the air to dissipate in all directions, and means for operating said arm or arms, substantially as described.

3. In a pneumatic straw stacker, the combination with a delivery chute, of an arm or arms projecting therefrom, a deflecting apron, pivotally attached to said arm or arms at a distance from the mouth of the delivery chute, and means for radially adjusting the same, substantially as described.

4. In a pneumatic straw stacker, the combination with a delivery chute, of a longitudinally slidable arm or arms projecting therefrom, a radially adjustable deflecting apron, pivoted to said arm or arms, means for operating said frame, and means for radially adjusting said apron, substantially as described.

5. In a pneumatic straw stacker, the combination with a delivery chute, of a longitudinally slidable arm or arms moving in bearings formed thereon, a radially adjustable deflecting apron, pivoted to said arm or arms, and means for radially adjusting said apron and for operating said arm or arms, substantially as described.

6. In a pneumatic straw stacker, the combination with a delivery chute, of a hollow longitudinally slidable arm projecting therefrom, a deflecting apron pivotally attached to said arm, pulleys journaled in said arm and rigidly connected together for effecting the radial adjustment of the deflecting apron, and means for controlling the movement of said pulleys, and for operating said slidable arm, substantially as described.

7. In a pneumatic straw stacker, the combination with a delivery chute, of an arm or arms projecting therefrom, a deflecting apron, attached to said arm or arms so as to be at a distance from the mouth of the delivery chute, and arranged in the path of the material delivered from said chute in such a manner as to direct its further course, and a guiding apron for preventing any of the material from being carried out of the range of action of the deflecting apron, substantially as described.

In testimony whereof I affix my signature in presence of two witnesses.

NATHAN NEWSOM.

Witnesses:
VICTOR J. EVANS,
M. APGAR.